UNITED STATES PATENT OFFICE.

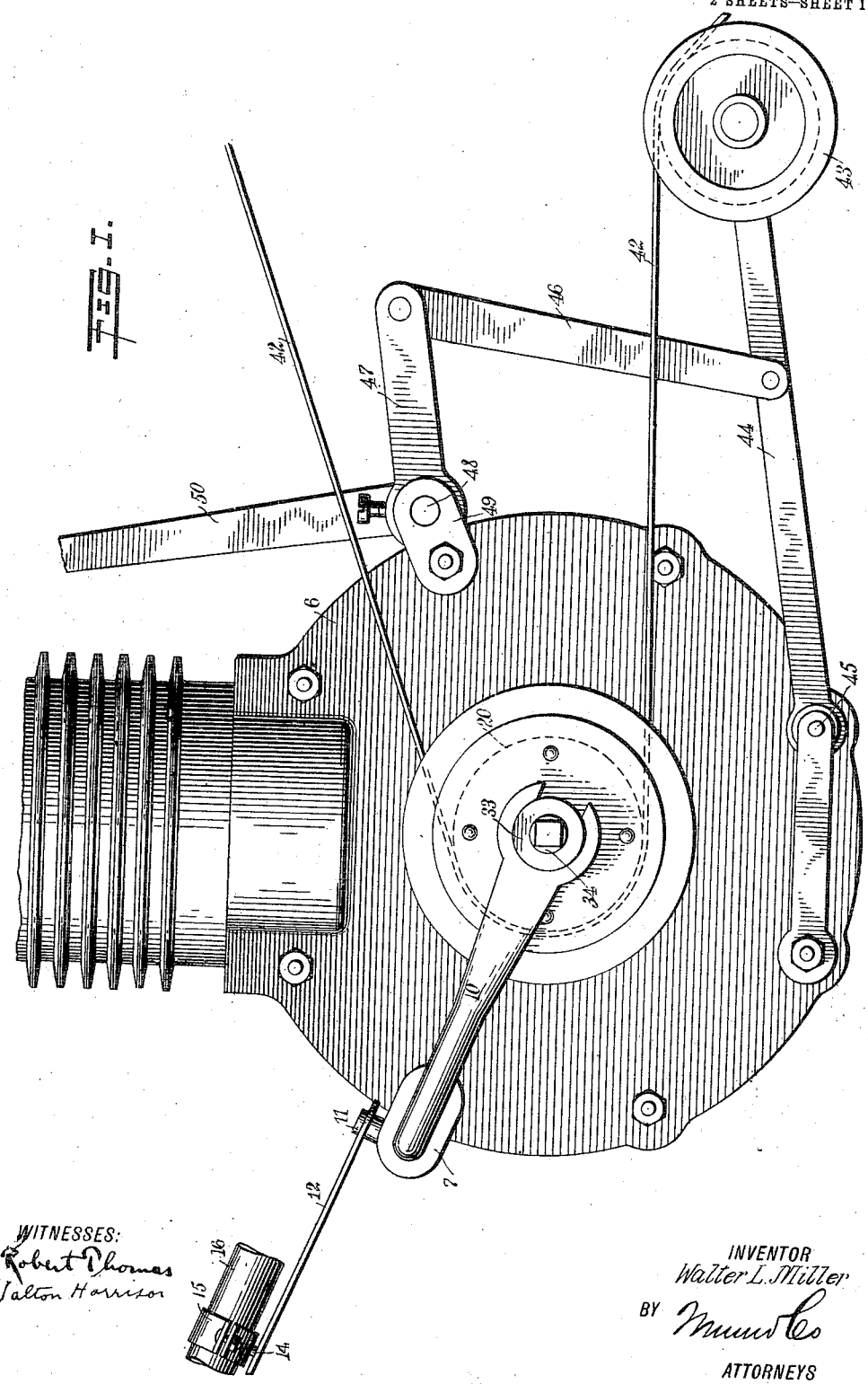

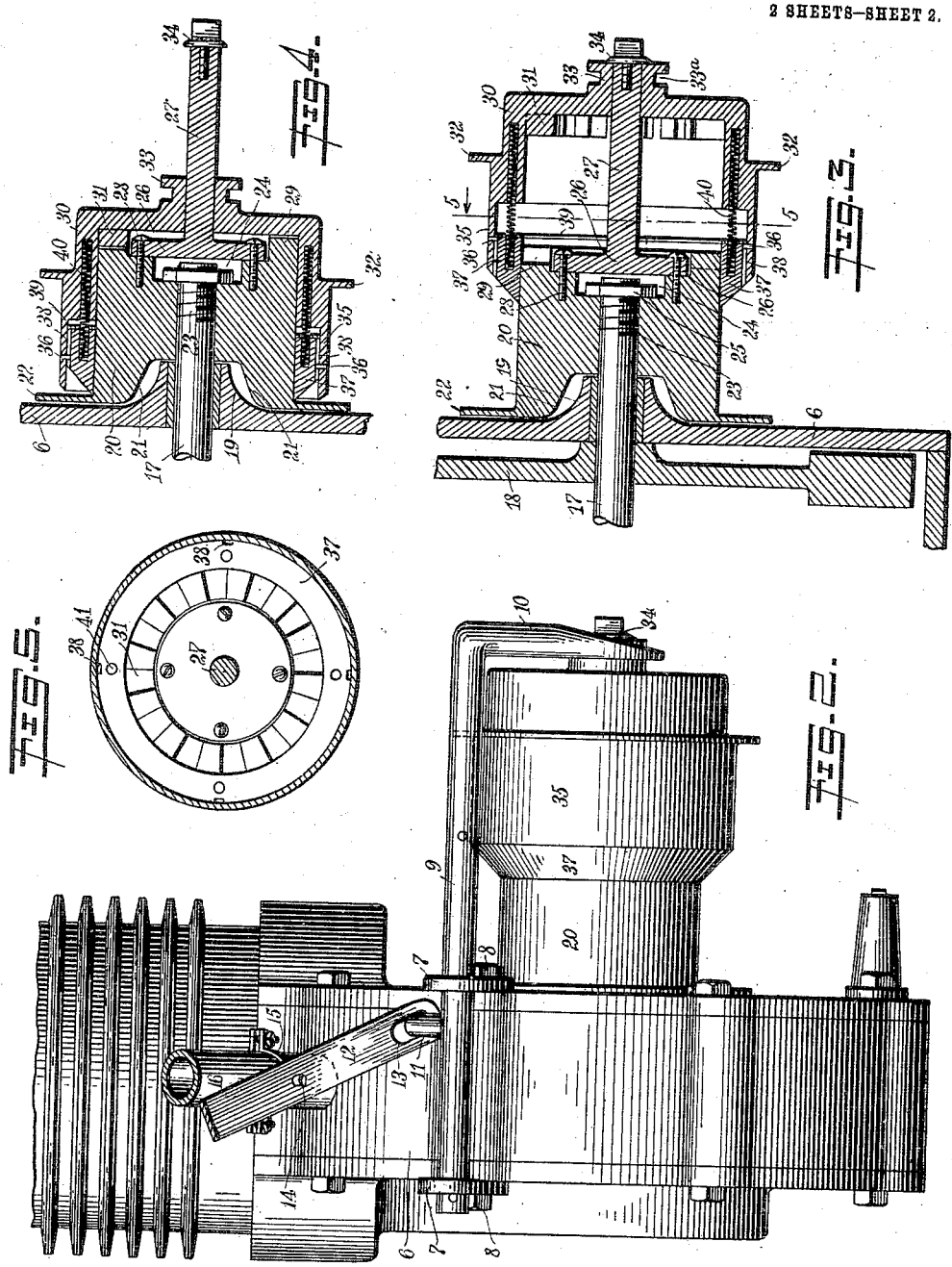

WALTER L. MILLER, OF SANTA FE, TERRITORY OF NEW MEXICO.

CHANGEABLE-SPEED GEARING.

973,287.

Specification of Letters Patent.   Patented Oct. 18, 1910.

Application filed May 25, 1910.   Serial No. 563,358.

*To all whom it may concern:*

Be it known that I, WALTER L. MILLER, a citizen of the United States, and a resident of Santa Fe, in the county of Santa Fe and Territory of New Mexico, have invented a new and Improved Changeable-Speed Gearing, of which the following is a full, clear, and exact description.

My invention relates to changeable speed gearing, my more particular purpose being to provide for two definite speeds to be given to a belt by causing the belt to be shifted from a revoluble member of one diameter to one of another diameter, the belt being always maintained substantially in the same plane.

My invention further relates to the improvement of various parts connected with changeable speed gearing generally.

Reference is to be had to the accompanying drawings forming a part of this specification, in which similar characters of reference indicate corresponding parts in all the figures.

Figure 1 is a side elevation showing my improved changeable speed gearing applied to an internal combustion engine; Fig. 2 shows the mechanism of Fig. 1, viewed as from a point at the left thereof; Fig. 3 is a fragmentary section through the changeable speed pulleys, showing the same arranged for low speed; Fig. 4 shows the changeable speed pulleys arranged for high speed; and Fig. 5 is a section on the line 5—5 of Fig. 3, looking in the direction of the arrow.

The engine is shown at 6 and is provided with brackets 7 mounted upon its opposite faces by aid of bolts 8. A slide rod 9 extends directly through these brackets 7 which are provided with openings for the purpose. The slide rod 9 is provided with a fork 10 which extends obliquely downward toward a point in axial alinement with the engine. Mounted upon the slide rod 9 is a stub shaft 11, and engaging the latter is a hand lever 12 which is provided with a slot 13 into which the stub shaft 11 extends. The lever 12 is mounted upon a pivot 14, the latter being carried by a collar 15 and extending downwardly from the same. This collar encircles a tubular support 16 which is fixed relatively to the engine, as will be understood from Fig. 2.

The main shaft of the engine is shown at 17 and carries the rotary member 18, the latter forming a part of the mechanism to which the elastic medium is applied within the engine in order to turn the shaft. The shaft 17 runs in a bearing 19 which extends outwardly a little from the engine casing. At 20 is a pulley which is provided with a depression 21 for receiving the bearing 19. The pulley 20 is further provided with an annular flange 22 which encircles a portion of the bearing 19 and is adapted to run in close proximity to the wall of the engine casing. The engine shaft is provided with a threaded portion 23 and the pulley 20 is provided with a recess 24 into which this threaded portion extends. A nut 25 is screwed tightly upon the threaded portion 23 and engages the adjacent surface of the pulley 20. The nut 25 is thus housed within the recess 24. A disk 26 covers the recess 24 and is integral with a stub shaft 27. Screws 28 extend through the disk 26 and into the pulley 20, this pulley being provided with a crown of teeth 29 encircling the disk 26. A revoluble member 30 having generally the form of a cap is provided internally with a crown of teeth 31, these teeth being adapted to fit between the teeth 29 so as to lock the cap rigidly in relation to the pulley 20. The cap 30 is further provided with an annular flange 32, this flange mating the flange 22 carried by the pulley 20. The cap 30 is further provided with a clutch member 33, the latter being provided with an annular groove 33$^a$. A large square headed bolt 34 is secured upon the outer end of the stub shaft 27 and forms a limiting stop for preventing excessive outward travel of the cap 30, as will be understood from Figs. 3 and 4. My purpose in squaring the head of the bolt 34 is to facilitate the application of a crank thereto in order to start the engine.

The cap 30 is provided with a barrel 35, which, together with the flange 32, serves the purpose of a high speed pulley. Spline pins 36 carried by the barrel 35 extend radially inward therefrom into grooves 38 formed in a collar 37. This collar has a general annular shape, but one of its edges is beveled. The adjacent edge of the barrel 35 is beveled correspondingly, so that the bevel of the collar 37 and the bevel of the adjacent edge of the barrel have the same slant, as will be understood from Fig. 3. The collar 37 is movable relatively to the barrel 35 in a direction coinciding with their common axis, but they necessarily turn together, owing to the spline pins 36. A ring 39 is carried by the collar 37 and travels therewith during the axial movement of the collar.

At 40 are spiral springs which extend into holes 41 in the collar 37. These spiral springs extend into corresponding holes in the cap 30. The tension of the springs 40 has a tendency to force the collar 37 inward—that is, toward the body of the engine—so that the ring 39 lodges against the spline pins 36. This prevents further movement of the collar 37 in the same direction, and consequently the spline pins serve as a limiting stop. When the ring 39 is thus against the spline pins 36, the bevels of the collar 37 and of the barrel 35 are practically continuations of each other, as will be understood from Fig. 3, so that the collar and barrel have practically a single bevel. The lower end of the fork 10 engages the head 33 so that the movements of the slide rod 9 and fork 10 cause the clutch head 33 to be moved in the general longitudinal direction of the main shaft.

A belt is shown at 42 and is adapted to run upon either the low speed pulley or the high speed pulley. As indicated by dotted lines in Fig. 1, the belt 42 happens for the moment to be in engagement with the low speed pulley 20. At 43 is an idle pulley which is journaled upon the outer end of an arm 44, this arm being mounted upon a pivot 45. A link 46 is pivoted to the arm 44 and is used for raising and lowering the same. Pivoted to the upper end of the link 46 is an arm 47, the latter being rigid upon a short shaft 48, the latter being carried by brackets, one of which is shown at 49. A hand lever 50 is used for rocking the shaft 48 and thereby raising and lowering the arm 44 and the idler 43, so as to tighten or loosen the belt 42, as desired.

The operation of my device is as follows: In order to change from low speed to high speed the operator, by manipulating the hand lever 50, loosens the belt 42 by lowering the idler 43. He next (see Fig. 2) turns the lever 12 upon the pivot 14 so as to move the fork 10 to the left according to this figure. The bevel of the pulley of large diameter is thus slipped under the adjacent edge of the belt and as the pulley of larger diameter is moved to the left according to Fig. 2, it gradually gets under the belt which does not stop running. The teeth 31 now engage the teeth 29 and lock together the cap 30 and the pulley 20. The belt now runs upon the pulley of larger diameter and a correspondingly slower movement is communicated to the belt.

To shift the belt back from the pulley of large diameter to the one of small diameter, the cap 30 is moved to the right as indicated in Fig. 3. The belt thereupon gradually drifts to the pulley 20. After the cap 30 has been in its extreme position to the left, according to Fig. 4, and is moved slightly to the right, so as to disengage the teeth 31 from the teeth 29, the pulley of larger diameter runs freely upon the pulley of smaller diameter so that the engine is for the moment free.

Having thus described my invention, I claim as new and desire to secure by Letters Patent:

1. A device of the character described, comprising a driving pulley of small diameter and a driving pulley of large diameter, said pulley of large diameter being hollow and loosely fitted over said pulley of small diameter, and a collar carried by said pulley of large diameter and encircling said pulley of small diameter, said collar being movable relatively to said pulley of large diameter and provided with a beveled edge for picking up a belt.

2. The combination of a pulley of small diameter, a disk secured thereto and having a stub shaft integral with said disk, a pulley of large diameter partially encircling said pulley of small diameter, said pulley of large diameter having an annular head encircling said stub shaft, and means for moving said pulley of large diameter relatively to said stub shaft and to said pulley of small diameter.

3. The combination of a pulley of small diameter, a pulley of large diameter fitted over said pulley of small diameter, a collar carried by said pulley of large diameter and partially encircling said pulley of small diameter, said pulley of large diameter having a beveled edge and said collar also having a beveled edge, said collar being free to move relatively to said pulley of large diameter, so as to carry said beveled edge of said collar into said pulley of large diameter, springs engaging said collar and also engaging said pulley of large diameter for the purpose of pressing said collar into a predetermined position relatively to said pulley of large diameter, and means controllable at will for shifting the position of said pulley of large diameter relatively to said pulley of small diameter.

4. The combination of a pulley of small diameter, a pulley of large diameter movable relatively to the same in the general direction of a common axis, said pulley of large diameter being provided with a barrel, a collar mounted within said barrel and movable relatively to said pulley of large diameter and also movable relatively to said pulley of small diameter, springs engaging said pulley of large diameter and also engaging said collar, spline mechanism connecting said pulley of large diameter with said collar in order to enable the turning movement of said pulley of large diameter to carry said collar, and means for moving said pulley of large diameter in the general direction of the axis of said pulley of small diameter.

In testimony whereof I have signed my name to this specification in the presence of two subscribing witnesses.

WALTER L. MILLER.

Witnesses:
 FRANK OWEN,
 Mrs. S. T. BLAKE.